United States Patent Office 3,468,892
Patented Sept. 23, 1969

3,468,892
SUBSTITUTED PIPERIDINES
Andrew S. Tomcufcik, Old Tappan, N.J., Paul F. Fabio, Pearl River, N.Y., and Arlene M. Hoffman, Park Ridge, N.J., assignors to American Cyanamid Company, Stamford, Conn., a corporation of Maine
No Drawing. Filed Feb. 7, 1966, Ser. No. 525,337
Claims priority, application Great Britain, Mar. 19, 1965, 11,814/65
Int. Cl. C07d 29/12
U.S. Cl. 260—293                                      8 Claims

ABSTRACT OF THE DISCLOSURE

Substituted amino alkylene substituted piperidines are described which are prepared by several methods, the preferred method being the reaction of a substituted amino alkylenepiperidine with an intermediate which places a group on the nitrogen of the piperidine. The present compounds are useful in inhibiting the growth of protozoa.

---

This invention relates to new organic compounds. More particularly, it relates to substituted alkylenepiperidines and methods of preparation thereof.

The novel compounds of this invention may be illustrated by the following formula:

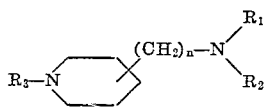

wherein $R_1$ is lower alkyl; $R_2$ is H or alkyl of from 1–12 carbon atoms, aralkyl or cycloalkyl; $R_3$ is a carbon atom which is unsaturated by being part of a substituted aryl radical of the benzene type series or part of an aromatic heterocyclic ring of at least 5 ring atoms containing not more than four hetero atoms or by being a carbonyl carbon; $n$ is 3 or 4 and the pharmaceutically acceptable salts of the above described compounds.

When $R_3$ is an aryl or substituted aryl radical, it may be for example, a chlorophenyl, nitrophenyl, aminophenyl, acetamidophenyl, benzenesulfonamidophenyl, naphthyl, or aminonaphthyl radical.

When $R_3$ is a substituted carbonyl carbon, besides being bonded to the piperidine nucleus it is also preferably bonded to a phenyl, biphenyl, halophenyl, dichlorophenyl, phenyltriazolyl, phenylazophenyl, benzyloxy, nitrofuryl, alkoxy, or trihalomethyl group.

When $R_3$ is an aromatic heterocyclic radical, the heterocycle contains not more than four hetero atoms and the remainder are carbon atoms. Among the heterocyclic compounds found useful in preparing the products of the present invention (wherein $R_3$ is heterocyclic) are, for example, 2-halopyridines,
4-halopyridines,
5-nitro-2-halopyridines,
2,5-dihalopyrimidines,
2-halothiazoles,
5-nitro-2-halothiazoles,
2-halobenzothiazoles,
2-halo-6-alkoxybenzothiazoles,
2-halobenzoxazoles,
2-halo-5-nitro-1,3,4-thiadiazoles,
4,7-dihaloquinolines,
2-haloquinolines,
4-halo-6-methoxyquinolines,
6-halopurines,
2-halopyrazines,
4-haloquinazolines,
2-halo-6-phenylimidazo[2,1-b]-1,3,4-thiadiazoles, 5-halo-1-aryltetrazoles and
2,3-dihaloquinoxalines.

Among the new compounds of this invention are, for example, 1-benzoyl-4-(3-dimethylaminopropyl)piperidine;
1-(4-chlorophenyl)-4-(3-dimethoxylaminopropyl) piperidine;
4'-[4-(dimethylaminopropyl)-1-piperidinyl]acetanilide;
4-(3-dimethylaminopropyl)-1-(4-pyridyl)piperidine;
1-(7-chloro-4-quinolyl)-4-(3-dimethylaminopropyl)-piperidine;
2-[4-(3-dimethylaminopropyl)-1-piperidinyl]benzothiazole;
4-(4-dimethylaminobutyl)-1-(4-nitrophenyl)piperidine;
1-(4-chlorophenyl)-4-(3-dimethylaminobutyl)-piperidine;
and 4-(3-dimethylaminopropyl-1-(4-methoxyphenyl)-piperidine.

The pharmaceutically acceptable salts of this invention include such salts as hydrochlorides, sulfates, maleates, fumarates, and 1,1'-methylene-bis-(2-naphthol-3-carboxylates) and quaternary salts.

The free bases of the compounds of the present invention are, in general, oils or lower melting solids, somewhat soluble in water and easily soluble in lower alkanols, benzene, toluene, acetone, chloroform or the like. The salts of the present invention are characteristically soluble in water and other hydroxylated solvents and are usually insoluble in non-polar solvent.

The compounds of the present invention may be conveniently prepared by reacting a compound of the formula:

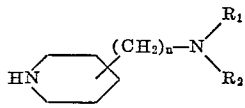

wherein $R_1$, $R_2$, and $n$ are as defined hereinabove with the compound $R_3Z$ wherein Z is halogen, OH, O-alkyl, $OSO_2$-alkyl, $OSO_2$-aryl, or an anhydride residue to form the product of the invention. The above reaction is usually carried out according to procedures well known in the art. For example, when Z is halogen the reaction may be carried out in a solvent such as, for example, a β-alkoxy alkanol, a lower alkanol, benzene, toluene, tetrahydrofuran, phenol or the like, and the reaction is then usually carried out by heating the reaction mixture in the presence of an acid acceptor such as a bicarbonate, triethylamine, or the like.

The compounds of the present invention may also be prepared by reacting a compound of the formula:

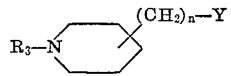

wherein Y is halogen, OH, $OSO_2$-alkyl or $OSO_2$-aryl with an amine of the formula:

in which $n$, $R_1$, $R_2$, and $R_3$, are as defined hereinbefore.

The reaction is usually carried out by heating the hexa-hydropyridine reactant in the presence of an excess of $HNR_1R_2$ in a solvent at an elevated temperature.

This invention also includes compositions of matter comprising a pharmaceutically acceptable carrier and a compound of the present invention or pharmaceutically acceptable salts thereof said compositions of matter capable of being administered at a dose of 1 mg. to 500 mg. of compound or salt thereof per kilogram of body weight of the warm blooded animal being treated.

The compounds of the present invention are active in inhibiting the growth of protozoa. They are particularly active in inhibiting protozoa of the genus Trypanosoma, different species of which are known to be the causative agent of serious parasitic diseases in man and animals (e.g., Trypanosomiasis or "sleeping sickness"). For example, the compound 4'-[4-(3-dimethylaminopropyl)-1-piperidinyl]-acetanilide has been found to be highly active against experimental infections with *Trypanosoma cruzi* in mice. *Trypanosoma cruzi* is the causative agent of Chagas' disease in South America, an American Trypanosomiasis.

The substituted piperidines described above may be dispensed as the active ingredient in compositions of the compound and an edible carrier. While the amount of drug to be given daily will depend on many factors such as size, weight, age, etc. of the warm blooded animal, it has been found that a daily intake of from 1 mg. to 500 mg./kg. of body weight will produce good results in warm blooded animals. The dosage unit may be in a form for a single unit per day, or smaller forms for use as multiple units per day. In the case of tablets, they may be of larger size, scored for use as fractional units one or more times per day.

The compositions can be dispensed in the form of soft or hard-shell gelatin capsules. Also present in the capsules may be diluents such as lactose, starch, magnesium oxide, magnesium stearate and the like. The capsules may be large enough to provide the desirable daily dosage or smaller to be used in multiple doses per day.

The compositions may be dispensed as parenteral solutions or suspensions. If larger doses in small amounts are desirable it may in some cases be necessary to use parenteral suspensions.

The compositions of the present invention may take the form of syrups or pediatric drops, Such formulations usually contain one or more of the following; suspending agents, buffer salts, stabilizers, preservatives, etc.

The testing of the present compounds against *T. cruzi* is carried out as follows: seven to eight week old Manor strain albino mice are inoculated subcutaneously with approximately 50,000 parasites (from infected donor mice), the median survival time of untreated mice being thirteen to sixteen days. Candidate compositions are administered by drug-diet on days 6–12 postinoculation. The principal criterion of chemotherapeutic activity is the survival time of treated mice relative to untreated mice but examination of the peripheral blood and of various internal organs for parasites is also done in some experiments. Activity is unaffected when the compounds are administered by gavage, or by subcutaneous or intraperitoneal injection. When compounds of the invention are administered to mice infected with *T. cruzi* as above, over 80% of the animals are healthy and free of parasites thirty days after the date of infection.

The following examples described in detail the preparation of representative piperazines of the present invention.

EXAMPLE 1

Preparation of 4-(3-dimethylaminopropyl)-1-(4-nitrophenyl)piperidine

A mixture of 30.9 grams of 4-(3-dimethylaminopropyl) piperidine, 26.2 grams of 1-fluoro-4-nitrobenzene, 20.1 grams of sodium bicarbonate, and 500 ml. of toluene is stirred at reflux for twenty-four hours. After cooling to room temperature, the inorganic solids are filtered off and the filtrate concentrated under reduced pressure to yield a yellow solid. Recrystallization from boiling ethyl acetate gives the pure compound melting at 93°–95° C.

Treatment of the free base with an acetone solution of maleic acid gives the monomaleate salt melting at 132°–134° C.

The 1-fluoro-4-nitrobenzene starting material may be replaced by the corresponding 1-chloro, 1-bromo, or 1-iodo-4-nitrobenzene to produce the desired compound.

EXAMPLE 2

Preparation of 4-(3-dimethylaminopropyl)-1-(4-aminophenyl)piperidine trihydrochloride One-half gram of platinum oxide is added to a solution of 3.6 grams of 4-(3-dimethylaminopropyl)-1-(4-nitrophenyl)piperidine (Example 1) in 100 ml. of ethyl acetate, and the mixture then hydrogenated under 30–45 lbs. per sq. inch pressure until hydrogen uptake is complete. The reaction mixture is then filtered into a flask containing 8 ml. of isopropanol containing 1.7 grams of hydrogen chloride. A precipitate forms immediately. After some hours, the precipitate is collected, dried in vacuo, and then recrystallized from ethanol containing 5% of water, to yield the pure compound melting at 237°–242° C. with decomposition.

EXAMPLE 3

Preparation of 4-(3-dimethylaminopropyl)-1-(4-acetamidophenyl)piperidine

A solution of 12.0 grams of 4-(3-dimethylaminopropyl)-1-(4-aminophenyl)piperidine in 200 ml. of ethyl acetate (prepared as in Example 2) is treated with 15 ml. of acetic anhydride at room temperature for two hours. The reaction mixture is concentrated to dryness under reduced pressure. Recrystallization of the residue from ether gives the pure compound melting at 107°–109° C. Treatment of the compound with an acetone solution of maleic acid gives the maleate salt melting at 145°–148° C. with decomposition.

EXAMPLE 4

Preparation of 4-(3-dimethylaminopropyl)-1-(4-lauramidophenyl)piperidine hydrochloride A solution of 4.5 grams of 4-(3-dimethylaminopropyl)-1-(4-aminophenyl)piperidine in 100 ml. of ethyl acetate (prepared as in Example 2) is treated with 5.7 grams of lauroyl chloride. After several hours, the precipitate is collected and recrystallized from ethanol to give the pure compound melting at 185°–190° C. with decomposition.

EXAMPLE 5

Preparation of 4-(3-dimethylaminopropyl)-1-(4-carbethoxyaminophenyl)piperidine dihydrochloride The subject compound is prepared by the procedure of Example 4, ethyl chloroformate replacing the lauroyl chloride. The pure compound melts at 225° C. with decomposition.

EXAMPLE 6

Preparation of 4-(3-dimethylaminopropyl)-1-(4-benzamidophenyl)piperidine hydrochloride The title compound is prepared by the procedure of Example 4, benzoyl chloride replacing the lauroyl chloride. The compound melts at 214°–217° C. with decomposition.

EXAMPLE 7

Preparation of 4-(3-dimethylaminopropyl)-1-(4-benzenesulfonamidophenyl)piperidine hydrochloride The subject compound is prepared by the procedure of Example 4, benzenesulfonyl chloride replacing the lauroyl chloride. The compound melts at 190°–192° C.

EXAMPLE 8

Preparation of 4-(3-dimethylaminopropyl)-1-(4-phenylureidophenyl)piperidine maleate A solution of 3.5 grams of 4-(3-dimethylaminopropyl)-1-(4-aminophenyl)piperidine in 100 ml. of ethyl acetate (prepared as in Example 2) is treated with 2.4 grams of phenyl isocyanate dissolved in 100 ml. of ethyl acetate. After standing at room temperature, the precipitate is collected and treated with an acetone solution of maleic acid to give the title compound melting at 140°–142° C.

EXAMPLE 9

Preparation of 4-[3-(N-methylbutylamino)propyl]-1-nitrophenyl)piperidine hydrochloride The compound is prepared essentially by the procedure of Example 1, 4-[3-(N-methylbutylamino)propyl]piperidine replacing the 4-(3-dimethylaminopropyl)piperidine. The compound melts at 149°–152° C.

EXAMPLE 10

Preparation of 4-[3-(N-methylbutylamino)propyl]-1-(4-acetamidophenyl)piperdine maleate The catalytic reduction of 4-[3-(N-methylbutylamino)propyl]-1-(4-nitrophenyl)piperidine (Example 9) by the procedure of Example 2 gives an ethyl acetate solution of 4 - [3 - (N - methylbutylamino)propyl] - 1 - (4-aminophenyl)piperidine. This is acetylated and converted to its maleic acid salt by the procedure of Example 3 to yield the subject compound melting at 98°–102° C. with decomposition.

EXAMPLE 11

Preparation of 4-[3-(N-methyl-n-octylamino)propyl]-1-(4-nitrophenyl)piperidine maleate The above compound is prepared by the method of Example 1, 4-[3-(N-methyl-n-octylamino)propyl]piperidine replacing the 4-(3-dimethylaminopropyl)piperidine. It melts at 75°–77° C. with decomposition.

EXAMPLE 12

Preparation of 4-(3-dimethylaminopropyl)-1-(4-biphenyloyl)piperidine hydrochloride A solution of 5.5 grams of 4-biphenyloyl chloride in 200 ml. of diethyl ether is treated with a solution of 4.3 grams of 4-(3-dimethylaminopropyl)piperidine in 100 ml. of diethyl ether, giving the title compound, melting point 170°–171° C.

EXAMPLE 13

Preparation of 4-(3-dimethylaminopropyl)-1-(4-iodobenzoyl)piperidine hydrochloride The above compound is prepared by the method of Example 12, 4-iodobenzoyl chloride replacing the 4-biphenyloyl chloride. After recrystallization from isopropanol, the compound melts at 170°–171° C.

EXAMPLE 14

Preparation of 4-(3-dimethylaminopropyl)-1-(2-phenyl-2H-1,2,3-triazol-4-oyl)piperidine The crude hydrochloride salt of the above compound is prepared by the procedure of Example 12, 2-phenyl-2H-1,2,3-triazol-4-oyl chloride replacing the 4-biphenyloyl chloride. The hydrochloride is converted to the free base by aqueous sodium hydroxide, which is purified by recrystallization from hexane and melts at 75°–77° C.

The corresponding 2 - (2,4 - dinitrophenyl)-2H-1,2,3-triazol-4-oyl derivative is prepared in a similar manner. It melts at 88°–91° C.

EXAMPLE 15

Preparation of 4-(3-dimethylaminopropyl)-1-(4-phenylazobenzoyl)piperidine hydrochloride The above compound is prepared by the method of Example 12, 4-phenylazobenzoyl chloride replacing the 4-biphenyloyl chloride. The compound melts at 180°–181° C.

EXAMPLE 16

Preparation of 4-[3-(N-methylbutylamino)propyl]-1-(2-phenyl-2H-1,2,3-triazol-4-oyl)piperidine dimaleate The above compound is prepared by the procedure of Example 14, 4-[3-(N - methylbutylamino)propyl]piperidine replacing the 4-(3-dimethylaminopropyl)piperidine. It melts at 165–167° C. with decomposition.

EXAMPLE 17

Preparation of 7-chloro-4-[4-(3-dimethylaminopropyl)-1-piperidino]quinoline

The preparation of the above compound is accomplished essentially by the procedure described in Example 1, an equivalent quantity of 4,7-dichloroquinoline replacing the 1-fluoro-4-nitrobenzene. The compound melts at 69°–72° C., while the trifumarate salt melts at 159°–161° C.

EXAMPLE 18

Preparation of 4-[4-(3-dimethylaminopropyl)-1-piperidino]pyridine dimaleate

The preparation of the above compound is accomplished by the procedure substantially as described in Example 1, an equivalent quantity of 4-chloropyridine replacing the 1-fluoro-4-nitrobenzene. The pure compound melts at 111°–114° C. with decomposition.

EXAMPLE 19

Preparation of 2-[4-(3-dimethylaminopropyl)-1-piperidino]benzothiazole maleate

The preparation of the above compound is accomplished by following the procedure of Example 1, an equivalent quantity of 2-chlorobenzothiazole replacing the 1-fluoro-4-nitrobenzene. The pure compound melts at 170°–172° C. with decomposition.

EXAMPLE 20

Preparation of 2-[4-(3-dimethylaminopropyl)-1-piperidino]-5-nitropyridine dimaleate The preparation of the above compound is accomplished by following the procedure of Example 1, an equivalent amount of 2-chloro-5-nitropyridine replacing the 1-fluoro-4-nitrobenzene. The pure compound melts at 150°–151° C.

EXAMPLE 21

Preparation of 1-[4-(3-dimethylaminopropyl-1-piperidino]-4-methylthioxanthone

Synthesis of the above compound is accomplished by the procedure described in Example 1, an equivalent of 1-chloro-4-methylthioxanthone replacing the 1-fluoro-4-nitrobenzene. The pure compound melts at 78°–80° C.

EXAMPLE 22

Preparation of 3-(3-dimethylaminopropyl)-1-(4-biphenyloyl)piperidine hydrochloride The compound is prepared by the method of Example 12, 3-(3 - dimethylaminopropyl)piperidine replacing the 4-(3 - dimethylaminopropyl)piperdine. It is purified by recrystallization from a mixture of isopropanol and diethyl ether and melts at 150°–152° C.

EXAMPLE 23

Preparation of 3-(3-dimethylaminopropyl)-1-(4-nitrophenyl)piperidine maleate

The compound is prepared by the procedure of Example 1, 3-(3-dimethylaminopropyl)piperidine replacing the 4-(3-dimethylaminopropyl)piperidine. It melts at 126°–127° C.

EXAMPLE 24

Preparation of 3-(3-dimethylaminopropyl)-1-(2-benzothiazolyl)piperdine maleate

The above compound is prepared by the method of Example 19, 3 - (3 - dimethylaminopropyl)piperidine replacing the 4-(3-dimethylaminopropyl)piperidine. The compound melts at 128°–129° C.

EXAMPLE 25

Preparation of 3-(3-dimethylaminopropyl)-1-(5-nitro-2-pyridyl)piperidine hydrochloride The compound is prepared by the procedure of Example 24, 2-chloro-5-nitropyridine replacing the 2-chlorobenzothiazole. The compound melts at 180.5–181.5° C.

EXAMPLE 26

Preparation of 2-(3-dimethylaminopropyl)-1-(4-biphenyloyl)piperidine hydrochloride The compound is prepared by the method of Example 12, 2-(3-dimethylaminopropyl)piperidine replacing the 4-(3-dimethylaminopropyl)piperidine. The compound melts at 175°–178° C. with decomposition.

EXAMPLE 27

Preparation of 2-(3-dimethylaminopropyl)-1-(4-nitrophenyl)piperidine maleate

The compound is prepared by the procedure of Example 1, 2-(3-dimethylaminopropyl)piperidine replacing the 4-(3-dimethylaminopropyl)piperidine. The compound melts at 123°–125° C.

EXAMPLE 28

Preparation of 4-(4-dimethylaminobutyl)-1-(4-nitrophenyl)piperidine hydrochloride The title compound is prepared by the method of Example 1, 4-(4-dimethylaminobutyl)piperidine replacing the 4-(3-dimethylaminopropyl)piperidine. The compound melts at 160°–163° C.

EXAMPLE 29

Preparation of 4-(4-dimethylaminobutyl)-1-(4-biphenyloyl)piperidine hydrochloride The compound is prepared by the method of Example 12, 4-(4-dimethylaminobutyl)piperidine replacing the 4-(3-dimethylaminopropyl)piperidine. It melts at 163°–165° C.

EXAMPLE 30

Preparation of 4-(4-dimethylaminobutyl)-1-(2-phenyl-2H-1,2,3-triazol-4-oyl)piperidine hydrochloride The subject compound is prepared by the procedure of Example 14, 4-(4-dimethylaminobutyl)piperidine replacing the 4-(3-dimethylaminopropyl)piperidine. It melts at 145°–147° C.

EXAMPLE 31

Preparation of 4-(4-dimethylaminobutyl)-1-(7-chloro-4-quinolyl)piperidine difumarate The subject compound is prepared by the method of Example 17, the 4-(4-dimethylaminobutyl)piperidine replacing the 4-(3-dimethylaminopropyl)piperidine. It melts at 178°–180° C.

EXAMPLE 32

Preparation of 1-(4-amino-1-naphthyl)-4-(3-dimethylaminopropyl)piperidine trihydrochloride Preparation of the above compound is carried out by the procedure of Example 2, 4-(3-dimethylaminopropyl)-1-(4'-nitronaphthyl)piperidine replacing the 4-(3-dimethylaminopropyl)-1-(4'-nitrophenyl)piperidine.

EXAMPLE 33

Preparation of 1-(4-acetamido-1-naphthyl)-4-(3-dimethylaminopropyl)piperidine

Utilizing the procedure described in Example 3, a solution of 1-(4-aminonaphthyl)-4-(3-dimethylaminopropyl)piperidine in ethylacetate, as described in Example 32, is treated with acetic anhydride to yield the compound of the example.

EXAMPLE 34

Preparation of 4-[3-(N-methylcyclohexylamino)propyl]-1-(4-biphenyloyl)piperidine hydrochloride The subject compound is prepared by the procedure of Example 12, 4-[3-(N-methylcyclohexylamino)propyl]piperidine replacing the 4-(3-dimethylaminopropyl)piperidine. The compound melts at 232°–234° C.

EXAMPLE 35

Preparation of 4-[3-(N-methylphenylethylamino)propyl]-1-(4-biphenyloyl)piperidine hydrochloride The subject compound is prepared by the procedure of Example 12, 4-[3-(N-methylphenylethylamino)propyl]piperidine replacing the 4-(3-dimethylaminopropyl)piperidine. The compound melts at 195°–197° C.

EXAMPLE 36

Preparation of 4-(3-dimethylaminopropyl)-1-(4-nitro-1-naphthyl)piperidine maleate The subject compound is prepared by the procedure of Example 1, 1-iodo-4-nitronaphthalene replacing the 1-fluoro-4-nitrobenzene.

EXAMPLE 37

Preparation of 4-(3-dimethylaminopropyl)-1-(1-phenyl-5-tetrazolyl)piperidine maleate The subject compound is prepared by the method of Example 1, 5-bromo-1-phenyltetrazole replacing the 1-fluoro-4-nitrobenzene. The compound melts at 155°–157° C.

EXAMPLE 38

Preparation of 4-(3-dimethylaminopropyl)-1-(5-nitro-2-thiazolyl)piperidine maleate The subject compound is prepared by the procedure of Example 1, 5-nitro-2-bromothiazole replacing the 1-fluoro-4-nitrobenzene. The compound melts below 60° C.

EXAMPLE 39

Preparation of 4-(3-dimethylaminopropyl)-1-(3-chloro-2-quinoxalinyl)piperidine hydrochloride The subject compound is prepared by the method of Example 1, 2,3-dichloroquinoaxaline replacing the 1-fluoro-4-nitrobenzene. The compound melts at 212°–214° C.

What is claimed is:

1. A piperidine of the formula:

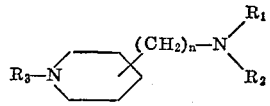

wherein $R_1$ is lower alkyl, $R_2$ is selected from the group consisting of hydrogen, lower alkyl and phenylloweralkyl, $R_3$ is selected from the group consisting of aminophenyl, nitrophenyl, alkanoylaminophenyl of 1 to 11 carbon atoms, carboloweralkoxyaminophenyl, benzamidophenyl, benzenesulfonamidophenyl, phenylureidophenyl, biphenyloyl and iodobenzoyl, $n$ is an integer of 3 to 4 and the pharmaceutically acceptable salts thereof.

2. The piperidine according to claim 1, 4-(3-dimethylaminopropyl) - 1 - (4 - benzenesulfonamidophenyl)-piperidine.

3. The piperidine according to claim 1, 3-(3-dimethylaminopropyl)-1-(4-biphenyloyl)-piperidine.

4. The piperidine according to claim 1, 4-[3-(N-methylbutylamino)propyl] - 1 - (4 - acetamidophenyl)-piperidine.

5. The piperidine according to claim 1, 4-(3-dimethylaminopropyl)-1-(4-aminophenyl)-piperidine.

6. The piperidine according to claim 1, 4-(3-dimethylaminopropyl)-1-(4-benzamidophenyl)-piperidine.

7. The piperidine according to claim 1, 4-[3-(N-methylbutylamino)propyl] - 1 - (4 - nitrophenyl)-piperidine.

8. The piperidine according to claim 1, 3-(3-dimethylaminopropyl)-1-(4-nitrophenyl)-piperidine.

References Cited

UNITED STATES PATENTS 3,222,370  12/1965  Cavallito et al. _____ 260—293

FOREIGN PATENTS 1,211,691  3/1960  France.

HENRY R. JILES, Primary Examiner
G. THOMAS TODD, Assistant Examiner

U.S. Cl. X.R.

260—156, 287, 288, 293.47, 294, 294.3, 294.7